United States Patent
Zheng et al.

(10) Patent No.: US 10,050,840 B2
(45) Date of Patent: Aug. 14, 2018

(54) METHOD AND SYSTEM FOR AN INTERNET OF THINGS (IOT) DEVICE ACCESS IN A SOFTWARE-DEFINED NETWORKING (SDN) SYSTEM

(71) Applicant: Telefonaktiebolaget L M Ericsson (publ), Stockholm (SE)

(72) Inventors: Jingbo Zheng, Beijing (CN); Shuo Yang, Beijing (CN); Samita Chakrabarti, Sunnyvale, CA (US); Prasanna Huddar, Bangalore (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 196 days.

(21) Appl. No.: 14/948,848

(22) Filed: Nov. 23, 2015

(65) Prior Publication Data

US 2017/0149614 A1 May 25, 2017

(51) Int. Cl.
*H04L 12/24* (2006.01)
*H04L 12/755* (2013.01)
(Continued)

(52) U.S. Cl.
CPC ............ *H04L 41/12* (2013.01); *H04L 45/021* (2013.01); *H04L 61/103* (2013.01);
(Continued)

(58) Field of Classification Search
None
See application file for complete search history.

(56) References Cited

U.S. PATENT DOCUMENTS

2008/0170567 A1* 7/2008 Joo .................. H04L 45/04 370/389
2013/0091279 A1* 4/2013 Haddad ............... H04L 12/2834 709/225

(Continued)

FOREIGN PATENT DOCUMENTS

WO 2013/128514 A1 9/2013

OTHER PUBLICATIONS

"OpenFlowSwitch Specification Version 1.3.5 (Protocol version 0X04)", Open Networking Foundation, Mar. 26, 2015, pp. 1-177.
(Continued)

*Primary Examiner* — Kevin C Harper
*Assistant Examiner* — Derrick V Rose
(74) *Attorney, Agent, or Firm* — Nicholson De Vos Webster & Elliott LLP

(57) ABSTRACT

Methods of Internet of Things (IoT) device access are disclosed. In one embodiment, a method is implemented in a software-defined networking (SDN) controller. The method includes receiving a node discovery request from a network device that receives a unicast neighbor solicitation message from an electronic device that supports IPv6. The unicast neighbor solicitation message contains an IPv6 address to be registered. The method also includes causing a device entry to be generated in a device discovery table, and transmitting an acknowledgment to the network device upon the device entry being generated successfully. The method continues with transmitting a request to the network device to generate a flow table entry for the electronic device based on a policy table. The flow table entry includes an operation to be performed, and the network device is to perform the operation on a packet received matching the flow table entry.

15 Claims, 8 Drawing Sheets

(51) Int. Cl.
  H04L 29/08  (2006.01)
  H04L 29/12  (2006.01)
  H04L 29/06  (2006.01)
(52) U.S. Cl.
  CPC ........ *H04L 63/0236* (2013.01); *H04L 63/101* (2013.01); *H04L 63/108* (2013.01); *H04L 67/12* (2013.01)

(56) References Cited

U.S. PATENT DOCUMENTS

| | | | | |
|---|---|---|---|---|
| 2014/0301378 | A1* | 10/2014 | Xu | H04L 41/12 370/338 |
| 2015/0156124 | A1* | 6/2015 | Tsuji | H04L 47/20 370/230 |
| 2015/0195149 | A1* | 7/2015 | Vasseur | H04L 41/5009 370/252 |
| 2015/0195183 | A1* | 7/2015 | Park | H04L 45/021 709/242 |
| 2016/0072717 | A1* | 3/2016 | Ansari | H04L 45/24 370/412 |
| 2016/0112315 | A1* | 4/2016 | Tosaka | H04L 45/741 370/392 |

OTHER PUBLICATIONS

Chakrabarti et al., "Mobile Network IOT Convergence", U.S. Appl. No. 14/525,139, filed Oct. 27, 2014, pp. 1-30.
Narten et al., "Neighbor Discovery for IP version 6 (IPv6)", Network Working Group, Request for Comments: 4861, Sep. 2007, pp. 1-97.
Montenegro et al., "Transmission of IPv6 Packets over IEEE 802.15.4 Networks", Network Working Group, Request for Comments: 4944, Standards Track, Sep. 2007, pp. 1-30.
Hui et al., "Compression Format for IPv6 Datagrams over IEEE 802.15.4-Based Networks", Internet Engineering Task Force (IETF), Request for Comments: 6282, Standards Track, Sep. 2011, pp. 1-24.
Shelby et al., "Neighbor Discovery Optimization for IPv6 over Low-Power Wireless Personal Area Networks (6LoWPANs)", Internet Engineering Task Force (IETF), Request for Comments: 6775, Standards Track, Nov. 2012, pp. 1-55.
Bormann et al., "Terminology for Constrained-Node Networks", Internet Engineering Task Force (IETF), Request for Comments: 7228, May 2014, pp. 1-17.
Kent et al., "Security Architecture for the Internet Protocol", Network Working Group, Request for Comments: 4301, Dec. 2005, pp. 1-101.
Housley, Using Advanced Encryption Standard (AES) CCM Mode with IPsec Encapsulating Security Payload (ESP), Network Working Group, Request for Comments: 4309, Standards Track, Dec. 2005, 13 pages.
J. Postel, "User Datagram Protocol," Aug. 28, 1980, 3 pages, RFC: 768.
S. Deering, et al., "Internet Protocol, Version 6 (IPv6) Specification," Dec. 1998, 39 pages, Network Working Group, Request for Comments: 2460, The Internet Society.
D. Borman, et al., "IPv6 Jumbograms," Aug. 1999, 9 pages, Network Working Group, Request for Comments: 2675, The Internet Society.
B. Fenner, et al., "Management Information Base for the User Datagram Protocol (UDP)," Jun. 2005, 19 pages, Network Working Group, Request for Comments: 4113, The Internet Society.
L. Eggert, et al., "Unicast UDP Usage Guidelines for Application Designers," Nov. 2008, 27 pages, Network Working Group, Request for Comments: 5405, IETF Trust and the persons identified as the document authors.

"Transmission Control Protocol, DARPA Internet Program Protocol Specification," Sep. 1981, 91 pages, RFC: 793, Information Sciences Institute, University of Southern California, Marina del Rey, California.
T. Socolofsky, et al., "A TCP/IP Tutorial," Jan. 1991, 28 pages, Network Working Group, Request for Comments: 1180.
K. Nichols, et al., "Definition of the Differentiated Services Field (DS Field) in the IPv4 and IPv6 Headers," Dec. 1998, 20 pages, Network Working Group, Request for Comments: 2474, The Internet Society.
S. Blake, et al., "An Architecture for Differentiated Services," Dec. 1998, 36 pages, Network Working Group, Request for Comments: 2475, The Internet Society.
J. Heinanen, et al., "Assured Forwarding PHB Group," Jun. 1999, 11 pages, Network Working Group, Request for Comments: 2597, The Internet Society.
D. Black, "Differentiated Services and Tunnels," Oct. 2000, 14 pages, Network Working Group, Request for Comments: 2983, The Internet Society.
K. Nichols, et al., "Definition of Differentiated Services Per Domain Behaviors and Rules for their Specification," Apr. 2001, 24 pages, Network Working Group, Request for Comments: 3086, The Internet Society.
D. Black, et al., "Per Hop Behavior Identification Codes," Jun. 2001, 8 pages, Network Working Group, Request for Comments: 3140, The Internet Society.
B. Davie, et al., "An Expedited Forwarding PHB (Per-Hop Behavior)," Mar. 2002, 16 pages, Network Working Group, Request for Comments: 3246, The Internet Society.
A. Charny, et al., "Supplemental Information for the New Definition of the EF PHB (Expedited Forwarding Per-Hop Behavior)", Mar. 2002, 24 pages, Network Working Group, Request for Comments: 3247, The Internet Society.
D. Grossman, "New Terminology and Clarifications for Diffserv," Apr. 2002, 10 pages, Network Working Group, Request for Comments: 3260, The Internet Society.
J. Babiarz, et al., "Configuration Guidelines for DiffServ Service Classes," Aug. 2006, 57 pages, Network Working Group, Request for Comments: 4594, The Internet Society.
F. Baker, et al., "A Differentiated Services Code Point (DSCP) for Capacity-Admitted Traffic," May 2010, 14 pages, Internet Engineering Task Force (IETF), Request for Comments: 5865, IETF Trust and the persons identified as the document authors.
E. Rosen, et al., "BGP/MPLS IP Virtual Private Networks (VPNs)," Feb. 2006, 47 pages, Network Working Group, Request for Comments: 4364, The Internet Society.
F. Baker, et al., "Management Information Base for the Differentiated Services Architecture," May 2002, 116 pages, Network Working Group, Request for Comments: 3289, The Internet Society.
Y. Bernet, et al., "An Informal Management Model for Diffserv Routers," May 2002, 56 pages, Network Working Group, Request for Comments: 3290, The Internet Society.
K. Chan, et al., "Differentiated Services Quality of Service Policy Information Base," Mar. 2003, 96 pages, Network Working Group, Request for Comments: 3317, The Internet Society.
M. Lasserre, et al., "Virtual Private LAN Service (VPLS) Using Label Distribution Protocol (LDP) Signaling," Jan. 2007, 31 pages, Network Working Group, Request for Comments: 4762, The IETF Trust.
K. Kompella, et al., "Virtual Private LAN Service (VPLS) Using BGP for Auto-Discovery and Signaling," Jan. 2007, 28 pages, Network Working Group, Request for Comments: 4761, The IETF Trust.
Chakrabarti et al., "Mobile Network IOT Convergence", U.S. Appl. No. 62/012,253, filed Jun. 13, 2014, pp. 1-30.

* cited by examiner

| Device IPv6 Address 314 | Device EUI-64 Address 316 | Network Element Identifier (ID) 318 | Network Element Port Identifier (ID) 320 | GW Indication 322 | lifetime 324 |
|---|---|---|---|---|---|

Device Discovery Table Entry 350

Flow Table Entry 450 For an IoT Device in a Network Element

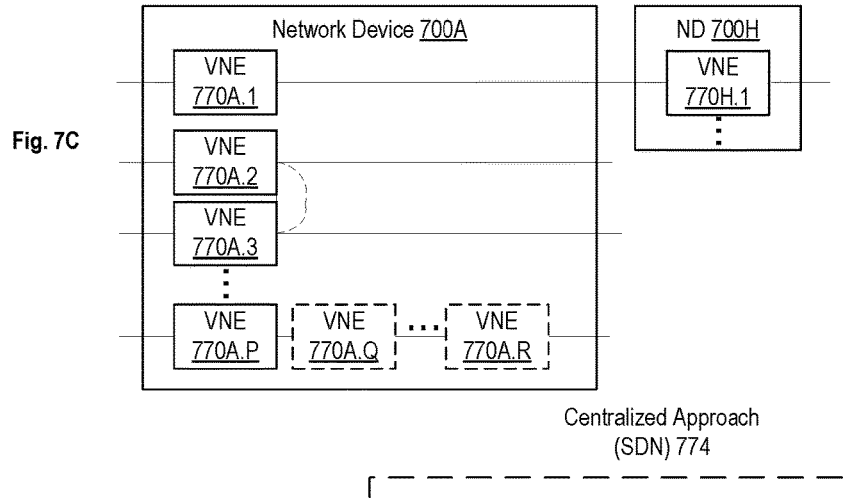

METHOD AND SYSTEM FOR AN INTERNET OF THINGS (IOT) DEVICE ACCESS IN A SOFTWARE-DEFINED NETWORKING (SDN) SYSTEM

FIELD OF INVENTION

The embodiments of the invention are related to the field of networking. More specifically, the embodiments of the invention relate to a method and system for an Internet of Things (IoT) device access in a software-defined networking (SDN) system.

BACKGROUND

In an Internet Protocol version 6 (IPv6) network, typically multicast is used for neighbor discovery. For example, Internet Engineering Task Force (IETF) Request for Comments (RFC) 4861 specifies how such neighbor discovery is performed. Yet, Internet of Things (IoT) devices often operate in a Low-power Wireless Personal Area Network (LoWPAN), where the links are often lossy, low-power, low-bit-rate, and/or short-range, thus multicast may not work well for device discovery in a LoWPAN environment for IoT devices.

Software-defined networking (SDN) is a network architecture that aims at decoupling control plane functions from data plane functions such that separate apparatuses may be utilized for different functions. In the SDN architecture, network intelligence and states are logically centralized, and the underlying network infrastructure is abstracted from the applications. As a result, networking may be simplified and new applications become feasible. For example, network virtualization can be accomplished by implementing it in a software application where the control plane is separated from the data plane. Also, a network administrator of a SDN system may have programmable central control of network traffic without requiring physical access to the system's hardware devices. With these benefits, SDN architecture based systems (referred to as SDN systems or SDN networks exchangeably herein below) are gaining popularity among carriers and enterprises.

A SDN system includes one or more SDN controllers and a set of network elements managed by the SDN controllers. It is challenging to manage a LoWPAN in a SDN architecture, so that the one or more SDN controllers may, at a central location, perform access control of remote LoWPAN nodes and discover the LoWPAN nodes as they join/leave.

SUMMARY

Methods of Internet of Things (IoT) device access are disclosed. In one embodiment, a method is implemented in a software-defined networking (SDN) controller of a SDN system, where the SDN system contains the SDN controller managing a network device. The method includes receiving a node discovery request from the network device, where the network device transmits the node discovery request upon receiving a unicast neighbor solicitation message from an electronic device that supports Internet Protocol version 6 (IPv6). The unicast neighbor solicitation message contains an IPv6 address to be registered. The method also includes causing a device entry to be generated in a device discovery table upon determining that there is no device entry for the IPv6 address in the device discovery table, and transmitting an acknowledgment to the network device upon the device entry being generated successfully. The method continues with transmitting a request to the network device to generate a flow table entry for the electronic device based on a policy table, where the policy table includes at least one of a service type and a service action for the electronic device. The flow table entry includes an operation to be performed, and the network device is to perform the operation on a packet received matching the flow table entry.

SDN controllers for IoT device access are disclosed. In one embodiment, a DSN controller manages a network device of a SDN system, the SDN controller comprises a processor and a non-transitory machine-readable storage medium coupled to the processor. The non-transitory machine-readable storage medium containing operations executable by the processor, where the SDN controller is operative to receive a node discovery request from the network device, where the network device transmits the node discovery request upon receiving a unicast neighbor solicitation message from an electronic device that supports Internet Protocol version 6 (IPv6). The unicast neighbor solicitation message contains an IPv6 address to be registered. The SDN controller is further operative to cause a device entry to be generated in a device discovery table upon determining that there is no device entry for the IPv6 address in the device discovery table, and transmit an acknowledgment to the network device upon the device entry being generated successfully. The SDN controller is further operative to transmit a request to the network device to generate a flow table entry for the electronic device based on a policy table, where the policy table includes at least one of a service type and a service action for the electronic device. The flow table entry includes an operation to be performed, and the network device is to perform the operation on a packet received matching the flow table entry.

Non-transitory machine-readable storage media for IoT device access in a software-defined networking (SDN) system are disclosed. In one embodiment, a non-transitory machine-readable storage medium has instructions stored therein, which when executed by a processor, cause the processor to perform operations in a SDN controller of a SDN system, where the SDN system contains the SDN controller managing a network device. The operations include receiving a node discovery request from the network device, where the network device transmits the node discovery request upon receiving a unicast neighbor solicitation message from an electronic device that supports Internet Protocol version 6 (IPv6). The unicast neighbor solicitation message contains an IPv6 address to be registered. The operations also include causing a device entry to be generated in a device discovery table upon determining that there is no device entry for the IPv6 address in the device discovery table, and transmitting an acknowledgment to the network device upon the device entry being generated successfully. The operations continue with transmitting a request to the network device to generate a flow table entry for the electronic device based on a policy table, where the policy table includes at least one of a service type and a service action for the electronic device. The flow table entry includes an operation to be performed, and the network device is to perform the operation on a packet received matching the flow table entry Embodiments of the disclosed techniques provides efficient ways in a SDN system to perform access control of LoWPAN nodes so that LoWPAN nodes may be registered efficiently as they join, and updated as their access information changes.

BRIEF DESCRIPTION OF THE DRAWINGS

The invention may best be understood by referring to the following description and accompanying drawings that are used to illustrate embodiments of the invention. In the drawings:

FIG. 7C illustrates various exemplary ways in which virtual network elements (VNEs) may be coupled according to some embodiments of the invention.

FIG. 7D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 7E illustrates the simple case of where each of the NDs implements a single NE, but a centralized control plane has abstracted multiple of the NEs in different NDs into (to represent) a single NE in one of the virtual network(s), according to some embodiments of the invention.

FIG. 7F illustrates a case where multiple VNEs are implemented on different NDs and are coupled to each other, and where a centralized control plane has abstracted these multiple VNEs such that they appear as a single VNE within one of the virtual networks, according to some embodiments of the invention.

DETAILED DESCRIPTION

Figure 1:
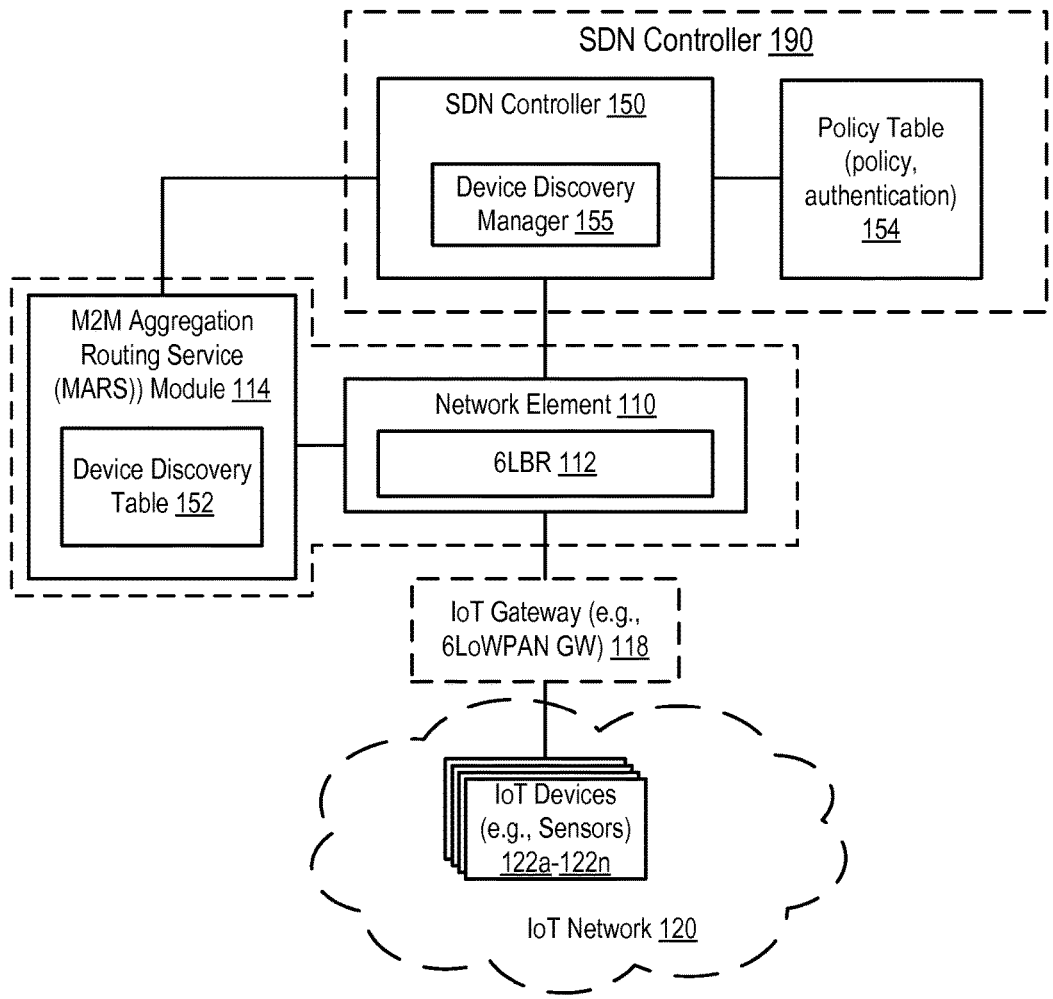
FIG. 1 illustrates a SDN system supporting device access of LoWPAN according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random-access memory (DRAM), static random-access memory (SRAM)) of that electronic device. Typical electronic devices also include a set or one or more physical network interface(s) to establish network connections (to transmit and/or receive code and/or data using propagating signals) with other electronic devices.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Architecture for Device Discovery of LoWPAN Devices in a SDN System

In a software defined networking (SDN) system, device discovery is often performed via protocols such as the link layer discovery protocol (LLDP) or proprietary protocols, where network devices advertise their identities, capabilities and neighbors. Yet LLDP typically requires full IP end-to-end network devices to operate. It may not be ideal to adopt LLDP like protocols for low power wireless personal area network (LoWPAN). For example, a LoWPAN may not support standard protocols in the media access control (MAC) layer such as ones in compliance with Institute of Electrical and Electronics Engineers (IEEE) 802.1D or 802.1Q, thus it may not exchange standard Ethernet frames. Instead, a LoWPAN may support physical/MAC layer in compliance with IEEE 802.15.4, Bluetooth (also known as 802.15.1), Z-Wave, or other protocols that may be tailored to the LoWPAN environment. It is desirable to support device discovery and general device access of a LoWPAN in a SDN system and it requires additional techniques to existing SDN mechanisms to allow LoWPAN device access in a SDN system.

FIG. 1 illustrates a SDN system supporting device access of LoWPAN according to one embodiment of the invention. Network 100 includes a set of IoT devices 122a-122n, which is a part of an IoT network120. The IoT network 120 is a 6LoWPAN in one embodiment. The 6LoWPAN may be a mesh network, where each node of the mesh network is an IoT device. The 6LoWPAN may include multiple subnets each being an IP routing domain. In one embodiment, the operations of the 6LoWPAN is in compliance with Internet Engineering Task Force (IETF) Request for Comments (RFC) 4944, entitled "Transmission of IPv6 Packets over IEEE 802.15.4 Networks", dated September 2007, by G. Montenegro et al., which is updated by RFC 6282, entitled "Compression Format for IPv6 Datagrams over IEEE 802.15.4-Based Networks", dated September 2011, by J. Hui et al., and RFC 6775, entitled "Neighbor Discovery Optimization for IPv6 over Low-Power Wireless Personal Area Networks (6LoWPANs)", dated November 2012, by Z. Shelby et al. The IoT network 120 is a constrained network in one embodiment. The constrained network may be a network of constrained nodes in compliance with the IETF 7228, entitled "Terminology for Constrained-Node Networks" dated May 2014, by C. Borman et al. IETF RFC 4944, RFC 6282, RFC 6775, and RFC 7228 are incorporated by reference herein in their entirety.

Each of the IoT devices 122a-122n may be a device of a certain type. Some IoT devices 122a-122n are electronic devices with one or more of sensors or measurement units, including temperature sensors, moisture sensors, light intensity sensors, utility meters, gas level sensors, switch devices, light emitters, sound sensors, vehicles, charging points, field soil sensors, industrial device monitors, building monitors, bridge monitors, environmental monitors, and body sensors. IPv6 may be in use for communications of the IoT devices 122a-122n in the IoT network 120. In one embodiment, hundreds even thousands IoT devices represented by IoT devices 122a-122n may be in one LoWPAN network such as the IoT network 120. Each of the IoT devices 122a-122n is a constrained node (e.g., a node in compliance with IETF 7228) in one embodiment.

An IoT device may be coupled to an IoT gateway 118 (an electronic device in one embodiment) through a link layer wireless communications protocol, such as Bluetooth, ZigBee (ZigBee 2004, 2006, PRO), Z-wave (Z-Wave Alliance), Wi-Fi (IEEE 802.11), wireless personal area network technology (e.g., IEEE 801.15.4), and Digital European Cordless Telecommunications (DECT), and WiMax. In one embodiment, the communication between the IoT gateway 118 and the IoT network 120 is secured. The IoT gateway 118 is a 6LowPAN gateway in one embodiment. The IoT gateway 118 connects the IoT devices 122a-122n to a SDN system including a network element 110 and a SDN controller 190. In one embodiment, the IoT devices 122a-122n may communicate with the SDN system directly, in which case the network element 110 may perform the functions of an IoT gateway. The links between the IoT gateway 118 and the IoT network 120 and within the IoT network 120 may be low-power, low-bit-rate, short-range, and lossy, exhibiting undetermined connectivity. Additionally, the IoT devices 122a-122n may save energy through long sleep periods.

The network element 110 is implemented in one or more network devices. The network element 110 may include routing/switching functionalities in a generic router/switch. In one embodiment, the network element 110 includes an OpenFlow switch in compliance with standards of the Open Networking Foundation, such as "OpenFlow Switch Specification", version 1.3.5, dated March 2015 (or its predecessors, successors, and/or related ONF standards). The functionalities of the network element 110 and the network devices implementing it are discussed in more details herein below in relation to FIGS. 7A-F. Additionally, the network element 110 may also include the functionalities of a 6LowPAN border router (6LBR). The functionalities of the 6LBR includes authorizing IPv6 prefix propagation for the 6LoWPAN the 6LBR is serving.

In one embodiment, the network element 110, IoT gateway 118, and IoT devices 122a-122n are all considered parts of a 6LowPAN, which may be in a mesh-under (IoT devices are connected to the 6LBR through a mesh using link-layer forwarding), route-over (IoT devices are connected to the 6LBR through the use of intermediate layer-3 routing), or star (the 6LBR being the center of the star) topology.

The functionalities of the 6LBR may also include or couple to a machine to machine (M2M) aggregation routing services (MARS) module 114. In one embodiment, the MARS module 114 and a separate 6LBR are within a network element (as shown with the dotted box in FIG. 1). The MARS module 114 collects IoT device data from the IoT devices 122a-122n directly or through IoT gateway 118, and provide authorization (e.g., through consulting with an AAA (authentication, authorization and accounting) server) of messages from and to the IoT devices. In one embodiment, the data collection and authorization are performed as described in U.S. patent application Ser. No. 14/525,139, entitled "Mobile Network IoT Convergence," incorporated by reference in its entirety herein.

The network element 110 communicates with a SDN controller such as SDN controller 150, which manages a number of network elements including the network element 110. Particularly a device discovery manager 155 resides in the SDN controller 150 to interact with the IoT network 120 for device discovery. The SDN controller 150 may be implemented in a network device, and its functionalities and the network devices implementing it are discussed in more details herein below in relation to FIGS. 7A-F and FIG. 8. For device discovery, the device discovery manager 155 interacts with a device discovery table 152 and a policy table 154. The device discovery table 152 resides within MARS module 114 in one embodiment as illustrated.

The device discovery table 152 registers the IoT devices the SDN controller interacts with. The device discovery table 152 may identify, for each IoT device, to which 6LowPAN the IoT device belongs, one or more addresses of the IoT device (including a MAC address, an extended unique identifier (EUI)-64 address, or an EUI-16 address (a shorten version of the EUI-64 address)), from which network element/network device and which port the IoT device is registered (the source of device registration), the lifetime of the registration of the IoT device, whether the IoT device is registered through an IoT gateway, the lifetime of the IoT registration. The device discovery table 152 may also identify the topology and neighboring information of the IoT device.

The device discovery table 152 provides one or more unique addresses for an IoT device to route its packet. For example, the IoT device may be assigned an IPv6 address, which contains 16 bytes. As known by a person having ordinary skills in the art, the 16 bytes of an IPv6 address includes two parts: an 8 bytes prefix (sometimes referred to as IPv6 prefix) may indicates the location of the IoT device, the 8 byte prefix may be updated when the physical or logical location of the IoT device changes; an 8 byte identifier may be associated with OSI upper layer (OSI layers 4-7) protocol to identify an IoT device independent of its location. The SDN controller 150 may coordinate with the network element 110 and provide the IPv6 prefix to an IoT device.

The policy table 154 indicates actions to be taken by the IoT devices 122a-122n. For example, the policy table 154 may include entries indicating services/actions to be performed by and/or for the IoT devices 122a-122n. An entry in the policy table 154 may include an IoT device identifier (ID), and one or more of a service ID, a service type, and service action(s). For example, a service type may be one or more of environmental monitoring, infrastructure management, and energy management. A service action may be enabling and disabling the associated service type. Thus, from the policy table 154, the SDN controller may determine what action to take when the SDN controller receives a request from an IoT device. The policy table 154 may also authenticate the validity of the request from an IoT device, e.g., determining whether the IoT device is authorized to get requested information and perform requested operations. The entries in the policy table 154 may be generated based on requests from upper layer (e.g., the application layer 786 as discussed herein below in FIG. 7D). For example, the entries may be generated based on the services that the IoT devices 122a-122n have subscribed and/or input from an operator of the IoT devices 122a-122n.

It is to be noted that the device discovery table 152 and/or the policy table 154 may be implemented in a variety of data structures other than a table, such as map, list, array, file, data base (relational database or Mongo database), etc. Additionally, the device discovery table 152 and/or the policy table 154 may be implemented within a SDN controller such as SDN controller 190. The device discovery table 152 and the policy table 154 may be integrated into a single data structure (e.g., an IoT registration table) that perform the functions of the two tables, and the device discovery table 152 and/or the policy table 154 may be implemented in a single electronic device or separately each implemented in one or more electronic devices. In one embodiment, the device discovery table 152 and/or the policy table 154 are implemented in the MARS module 114, which may be implemented outside of the SDN controller 190.

As illustrated, the MARS module 114 is implemented outside of the 6LBR 112. The MARS module and the AAA server it interacts with may be implemented outside of the 6LBR 112 and in an electronic device coupled to the network element 110. However, in some embodiments, the MARS module is implemented inside the 6LBR 112 or elsewhere in the network element 110.

6LoWPAN Node Access Processes in a SDN System

Neighbor discovery processes for IPv6 are defined in the standard such as IETF RFC 4861. Neighbor discovery in IETF RFC 4861 defines five different Internet Control Message Protocol (ICMP) packet types: A pair of router solicitation (RS) and router advertisement (RA) messages, a pair of neighbor solicitation (NS) and neighbor advertisements (NA) messages, and a redirect (R) message. The messages serve the following purposes:

Router solicitation: When an interface becomes enabled, hosts may send out router solicitations that request routers to generate router advertisements immediately rather than at their next scheduled time.

Router advertisement: Routers advertise their presence together with various link and Internet parameters either periodically, or in response to a router solicitation message. Router advertisements contain prefixes that are used for determining whether another address shares the same link (on-link determination) and/or address configuration, a suggested hop limit value, etc. A router advertisement allows a router to inform a host how to perform address auto-configuration. For example, routers can specify whether hosts should use DHCPv6 and/or autonomous address configuration.

Neighbor solicitation: Sent by a node to determine the link-layer address of a neighbor, or to verify that a neighbor is still reachable via a cached link-layer address. Neighbor solicitations are also used for duplicate address detection.

Neighbor advertisement: A response to a neighbor solicitation message. A node may also send unsolicited neighbor advertisements to announce a link-layer address change.

Redirect: Used by routers to inform hosts of a better first hop for a destination.

In a 6LoWPAN system, a host may be an IoT device such as the IoT devices 122a-122n, a router may be a network element operating in a SDN system such as the network element 110, and a node may be either the IoT devices or the network element. Since in a SDN system, intelligence of packet forwarding is shared between a network element and a SDN controller such as SDN controllers 150/190, a neighbor discovery process operates differently from a typical IPv6 system. The neighbor discovery process and the message formats used within are known in the art and not repeated below; rather, the specification highlights the relevant parts that are different because of the characteristics of 6LoWPAN and SDN system.

Figure 2:
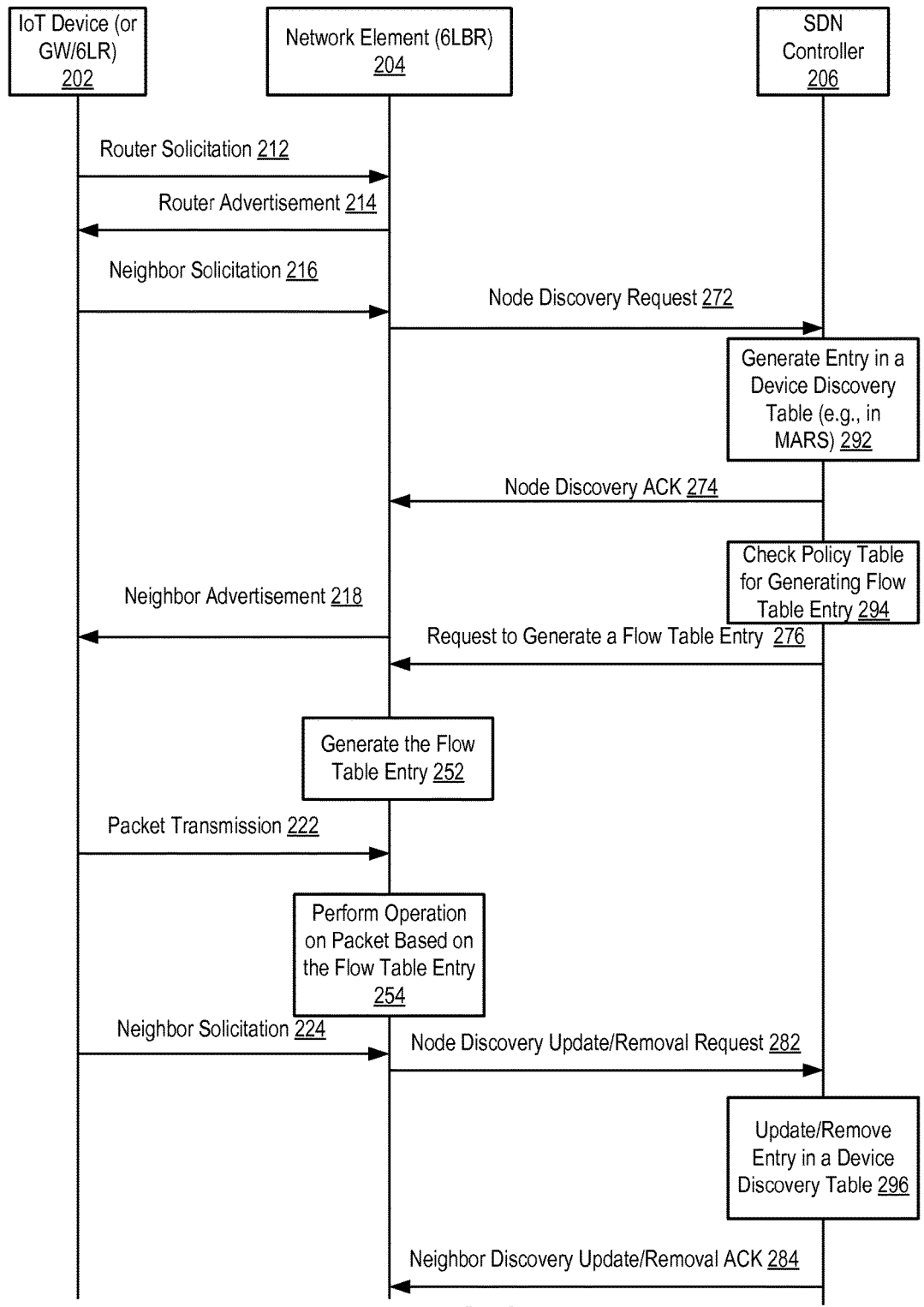
FIG. 2 illustrates operations of 6LowPAN node access in a SDN system according to one embodiment of the invention.

FIG. 2 illustrates operations of 6LowPAN node access in a SDN system according to one embodiment of the invention. The node access is for an IoT device, such as an IoT device 202. In one embodiment, the messages to and from the IoT device are relayed through a gateway (e.g., IoT gateway 118 as illustrated in FIG. 1) or a 6LoWPAN router (6LR) (which may present when the 6LoWPAN is in a route-over topology). The neighbor discovery process involves both a network element 204 (which is similar to the network element of 110 of FIG. 1) and a SDN controller 206 (which is similar to the SDN controller 150 or 190). It is to be noted that while the process may be referred to as a neighbor discovery process to be consistent with existing neighbor discovery protocol, the specification refers the process as a node access process as the process registers and a 6LowPAN node in a device discovery table and updates the access information, and the process makes neighbor discovery through multicasting according to IETF RFC 4861 unnecessary.

The node access process starts with the IoT device 202 transmits a router solicitation message 212 to the network element 204. The router solicitation message 212 is sent either at the startup of the IoT device 202 or when the neighbor unreachability detection (NUD) of one of its default routers (e.g., another network element different from the network element 204). The router solicitation message 212 includes a source link-layer address option (SLLAO) option in one embodiment, and the source link-layer address in the SLLAO option is an IPv6 address of the IoT device 202 (although when an IoT gateway relays the router solicitation message 212, the IPv6 address is the address of the IoT device instead of the IoT gateway).

Upon receiving the router solicitation message 212, the network element 204 replies with a router advertisement message 214. The router advertisement message 214 typically contains an authoritative border router option (ABRO) and may optionally contain one or more 6LoWPAN context options (6Cos) in addition to the existing prefix information options (PIOs) as described in IETF RFC 4861. In one embodiment, the network element 204 advertises its presence together with various link and Internet parameters periodically through the router advertisement message 214 to the IoT device 202 without receiving the router solicitation message 212. The IoT device 202 configures its IPv6 address (or addresses of each for one interface of the IoT device 202) based on the information received in the router advertisement message 214. The IPv6 address of the IoT device 202 is typically associated with a lifetime, expiration of which invalidates the association of the IPv6 address with the IoT device 202 (e.g., a packet with the destination address being the IPv6 address will no longer be routed to the IoT device 202 after the expiration). The lifetime is a value in the range of zero to 18 hours in one embodiment.

It is to be noted that the discussion below focuses on a single IPv6 address of the IoT device 202, but the principle of the invention applies to registration of multiple IPv6 addresses of the IoT device 202. Also it is to be noted that without being noted otherwise, the IoT device address is one of the IoT device's IPv6 addresses.

The IoT device 202 then transmits a neighbor solicitation message 216 to the network element 204 to register the IPv6 address. The neighbor solicitation message 216 is a unicast message and it contains the IPv6 address to be registered. When the unicast message is transmitted from an IoT gateway or a 6LR to the network element 204, the address to be registered is still the IoT device address instead of the IoT gateway or 6LR address. The IPv6 address to be registered is included in an address registration option (ARO) in the neighbor solicitation message 216. The IPv6 address to be registered is the IPv6 address of an interface of the IoT device in one embodiment. The neighbor solicitation message 216 also includes a lifetime of the address to be registered in one embodiment.

The network element 204 may optionally authenticate the neighbor solicitation message 216, and confirm that the neighbor solicitation message 216 is a valid neighbor solicitation message from a legitimate IoT device (e.g., confirming the IoT device is one that is supposed to be communicating with the network element 204 and the neighbor solicitation message passes a checksum verification or other encryption/security mechanism). In one embodiment, the authentication of the neighbor solicitation message 216 is through the MARS module and corresponding AAA server discussed herein above. Upon the network element 204 determines that the neighbor solicitation message 216 is a valid neighbor solicitation message from a legitimate IoT device, the network element 204 determines how to respond to the neighbor solicitation message 216.

In one embodiment, the network element 204 includes a neighbor cache (also referred to as neighbor cache table, which may be implemented in data structures such as map, list, array, file, data base (relational database or Mongo database)), which stores a set of entries about nodes (e.g., IoT devices like IoT device 202) to which traffic has been sent recently. Entries are keyed on the nodes' IPv6 addresses in one embodiment and contain information such as: the node's link-layer address; a flag indicating whether the node is a network element, an IoT gateway, or another IoT device; and a pointer to any queued packets waiting for address resolution to complete. When the neighbor cache contains an entry for the IPv6 address and the associated L2 address(es) (e.g., the EUI-64, EUI-16, and/or MAC address) matches the L2 address of the IoT device 202, the IoT device has been registered previously, and no registration is required. In that case, the network element 204 returns a neighbor advertisement message to the IoT device 202 in one embodiment, indicating that the registration is complete. The IoT device 202 can then transmit packets to the network element 204. The neighbor cache entry may be generated from a previous neighbor solicitation message from the IoT device 202 that contains the same address to be registered and the registration has not expired yet (e.g., the IoT device starts up from a reset thus the address has been registered previously). However, when the neighbor cache does not contain an entry for IoT device 202, the process continues as below.

The network element 204 transmits a node discovery request 272 to the SDN controller 206. In one embodiment, the node discovery request 272 is a PACKET_IN message in compliance with the ONF standards discussed herein above. The node discovery request 272 includes the IPv6 address to be registered (e.g., the address being extracted from the address registration option) and at least one of a MAC address, an EUI-64 address, and an EUI-16 address of the IoT device 202 in one embodiment. The node discovery request 272 additionally includes information received from the neighbor solicitation message 216 such as the lifetime of the registration of the IoT device, whether the IoT device is registered through an IoT gateway, and/or the lifetime of the IoT registration in one embodiment.

The SDN controller 206 receives the node discovery request 272, and checks a device discovery table (e.g., the device discovery table 152) coupled to the SDN controller. If there is a device discovery table entry associated with the address to be registered and the device discovery table entry is associated with a different IoT device (e.g., the device discovery table entry is associated with a MAC address, an EUI-64 address, or an EUI-16 address different from the MAC address, EUI-64 address, or EUI-16 of the IoT device 202), the SDN controller 206 returns an error message to the network element 204, indicating that the IoT device cannot be registered. In one embodiment, the error message indicates the reason of the failure.

Figures 3, 4:
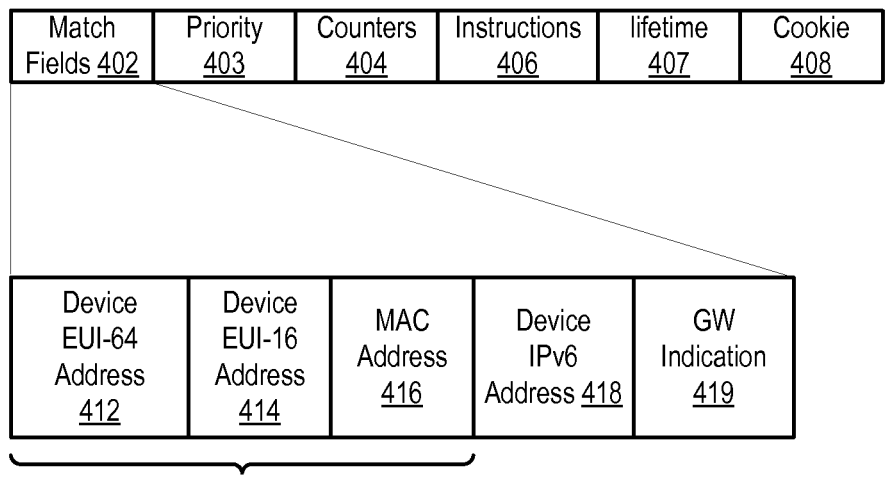
FIG. 3 illustrates a device discovery table entry according to one embodiment of the invention.
FIG. 4 illustrates a flow table entry for an IoT device according to one embodiment of the invention.

If the device discovery table does not contain a device discovery table entry associated with the address to be registered, the SDN controller causes an entry in the device discovery table for the IoT device to be generated at reference 292. The SDN controller may generate the entry in the device discovery table on its own when the device discovery table is within the SDN controller. Otherwise the SDN controller may request another electronic device to generate the entry. For example, the SDN controller may transmit a request to the MARS module 114 (or other electronic device contains the device discovery table) so that the MARS module 114 generates the entry in the device discovery table when the device discovery table is within the MARS module 114. In which case, the MARS module 114 sends a success or failure indication depending on the result of the entry generation. FIG. 3 illustrates a device discovery table entry according to one embodiment of the invention. The device discovery table entry 350 is in a device discovery table coupled to a SDN controller such as the SDN controller 150/190/206. The device discovery table entry 350 includes a device IPv6 address 314, a device EUI-64 address 316, a network element identifier (ID) 318, a network element port identifier (ID) 320, a gateway indication 322 and a lifetime 324. In some embodiment, a device EUI-16 address or a MAC address is included in the device discovery table entry 350 in addition to or in the place of the device EUI-64 address 316. As known by the person having ordinary skill in the art, the port of a network element is an endpoint of communication to the network element, and it is typically a logical construct that identifies a specific processor or a type of service (e.g., transmission control protocol (TCP) ports and user datagram protocol (UDP) ports). The port number is typically a 16-bit unsigned integer, thus ranging from 0 to 65535.

The device IPv6 address 314 is the address to be registered of the IoT device 202. The device EUI-64 address 316 (or the device EUI-16 address, the MAC address) is the EUI-64 address (or the EUI-16 address, the MAC address) of the IoT device 202. The network element ID 318 and the network element port ID are the ID of the network element and the ID of the network element port respectively from which the corresponding node discovery entry generation request is received.

The gateway indication 322 indicates whether or not the corresponding node discovery entry generation request is received based on a neighbor solicitation message relayed through an IoT gateway. For example, the gateway indication 322 may be a bit value, with one value (e.g., 1) indicating the device discovery table entry 350 is generated based on a neighbor solicitation message relayed through an IoT gateway, while another value (e.g., 0) indicating otherwise.

The lifetime 324 indicates the lifetime of the device discovery table entry 350, expiration of which the device discovery table entry 350 will be removed or otherwise made invalid for registration purpose. It is to be noted that the lifetime 324 may be the lifetime received from a node discovery entry generation request such as the node discovery entry generation request 272; however, the lifetime 324 may be a different value which consider the propagation and process delay from a network element/IoT device (such as network element 204 or the IoT device 202) to the SDN controller and the lifetime 324 is a value lower than the lifetime in the node discovery entry generation request (received lifetime from the node discovery entry generation request—expected/calculated propagation and process delay). Additionally, the lifetime 324 may be a different value based on information that the SDN controller receives from other sources (e.g., operator request), which may make the lifetime 324 a value deviates from the received lifetime in the node discovery entry generation request.

It is to be noted that not all of the entities 314-324 discussed above will present in all the device discovery table entry. Depending on implementation, some entities may be ignored and others may be added to a device discovery table entry.

Once the device discovery table entry is generated for the IoT device 202 in the device discovery table, the SDN controller 206 transmits an acknowledgement 274 to the network element 204. In one embodiment, the acknowledgement 274 is in a PACKET_OUT message format in compliance with the ONF standards discussed herein above. Upon receiving the acknowledgement, the network element 204 transmits a neighbor advertisement 218 to the IoT device. The neighbor advertisement 218 includes an ARO, which contains the IPv6 address that has been registered in the device discovery table, indicating the IPv6 address has been registered.

Additionally, when the network element 204 contains a neighbor cache, a neighbor discovery module within the network element 204 may be notified about the creation of the device discovery table entry. The network element may add a corresponding entry for the IoT device in the neighbor cache so that subsequent neighbor solicitation messages from the IoT device 202 may be replied by the network element 204 without the involvement of the SDN controller 206. Additionally, if the neighbor cache contains an existing entry for the IoT device, the network element may override the existing entry for the IoT device (e.g., when the SDN controller 206 sets an override flag indicating the newly generated device discovery table entry should trigger an override of the existing entry). For example, the lifetime of the corresponding entry in the neighbor cache may be overwritten by a new lifetime based on the neighbor discovery update message 284.

The SDN controller 206 then checks a policy table (e.g., the policy table 154) for generating a flow table entry for the IoT device 202 at reference 294. Once the IoT device 202 is registered with the SDN controller 206, the SDN controller 206 may direct the IoT device 202 for actions/services to be performed by and/or for the IoT device 202 as discussed herein above. The SDN controller 206 provides such directions through instructing the network element 204 to generate one or more flow table entries for the IoT device 202. The SDN controller 206 transmits a request to generate a flow table entry 276 after a device discovery table entry has been generated for the IoT device 202 and the proper actions/services to be performed by and/or for the IoT device 202 have been determined at least partially based on the policy table.

The request to generate a flow table entry 276 may be in an OFPT_FLOW_MOD message format in compliance with the ONF standards discussed herein above. The OFPT_FLOW_MOD message may include parameters to indicate the matching fields to match the flow table entry, the priority of the flow table entry when multiple flow table entry matches to the same packet, the actions to take upon a packet matching the flow table entry, the lifetime of the flow table entry, etc. It is to be noted that once the IoT device 202 is registered with the SDN controller 206 through the device discovery table, multiple flow table entries may be generated for the IoT device 202 through SDN controller transmitting one or more requests to generate a flow table entry. The request to generate a flow table entry 276 may also in an OFPT_TABLE_MOD message format when there is no flow table generated in the network element 204 yet, or in an OFPT_GROUP_MOD message format when the SDN controller 206 determines that a group table entry should be generated instead of a flow table entry. For simplicity of discussion, only flow table entry generation is described herein below, but the principle of the invention applies to the generation of a group table entry, or the generation of a flow table followed by one or more flow table entries.

The network element 204 generates a flow table entry at reference 252 upon receiving the request to generate the flow table entry. FIG. 4 illustrates a flow table entry for an IoT device according to one embodiment of the invention. A flow table entry 450 for an IoT device (e.g., IoT device 202) in a network element (e.g., network element 204) includes the following fields:

Match fields 402: To match against packets. The composition of the match fields is detailed herein below.
Priority 403: Matching precedence of the flow table entry.
Counters 404: Counting the number of packet matching; Updated when packets are matched.
Instructions 406: Actions to modify the action set or packet pipeline processing of a matching packet.
Lifetime 407: Maximum amount of time or idle time before flow is expired by the network element. Lifetime may also called timeout in some embodiments.
Cookie 408: Opaque data value chosen by the SDN controller. May be used by the controller to filter flow statistics, flow modification, and flow deletion.

The match fields 402 includes one or more L2 addresses such as a device EUI-64 address 412, a device EUI-16 address 414, a MAC address 416. The match fields may also include a device IPv6 address 418, and a gateway indication 419. The values of these fields are based on the corresponding values of these fields in the device discovery table entry such as the device discovery table 350 as discussed herein above. In some embodiments, the match fields also include the network element ID and network element port ID, matching the values of the corresponding device discovery table entry. Additionally, the value of the lifetime 407 may be the same as the one of the lifetime 324 or derived from the one of the lifetime 324 (e.g., based additionally on the characteristics of the network element in which the flow table is generated and communication between the network element and the corresponding SDN controller). The instruction 406 is generated based on the actions/services to be performed by and/or for the IoT device 202 as determined by the SDN controller.

Referring back to FIG. 2, once the flow table entry is generated for IoT device 202 at the network element 204, the network element 204 transmits a neighbor advertisement message to the IoT device in one embodiment. In other words, instead of sending the neighbor advertisement message 218 after receiving the node discovery acknowledgment 274, the network element 204 sends the neighbor advertisement message after the corresponding flow table entry is generated. In that embodiment, the neighbor advertisement message include a new lifetime based on the new lifetime 407.

Once the flow table entry is generated, the network element 204 is ready to process packets from the IoT device 202 (directly from the IoT device, relayed through an IoT gateway or 6LR). A packet from the IoT device 202 is transmitted at reference 222 to the network element 204. The network element 204 matches the packet to the match fields (e.g., the match fields 402) of the flow table entries in the flow table of the network element. Upon finding a matching flow table entry, the network element 204 performs corresponding operation or operations in the matching flow table entry as specified in the instructions field (e.g., the instructions 406) at reference 254.

The network element 204 may generate a plurality of flow table entries for the same IoT device 202. For example, when packets transmitted from the same IoT device 202 but received at different ports may warrant different operations, thus the network element 204 may have several flow table entries, with match fields being identical but the network element port numbers. Obviously, the plurality of flow table entries for the same IoT device 202 may have other different match fields too to process the packets from the IoT device 202 differently based on the content of the packet (e.g., the EUI-64 address, EUI-16 address, MAC address, IPv6 address, gateway indication, network element port ID).

The network element 204 may request update or remove a device discovery table entry by transmitting a node discovery update request or node discovery removal request 282. The request may be generated for a variety of reasons. For example, the IoT device 202 may send another neighbor solicitation message 224, which contains updated information. For example, the updated information may include an ARO, which contains a different lifetime value, an updated L2 address, and/or an updated IPv6 address to be registered (e.g., the IPv6 prefix is changed due to an updated topology of the 6LoWPAN). It is to be noted that the different lifetime value can be zero, which indicates the request of removal of the corresponding device discovery table entry.

The network element 204 then transmits the node discovery update request or node discovery removal request 282 to the SDN controller 206. The node discovery entry update request or node discovery entry removal request 282 includes the updated information, and based on the updated information, the SDN controller 206 causes an update or removal of a corresponding entry in the device discovery table at reference 296.

Depending on whether or not the update or removal of the corresponding entry in the device discovery table is successful, the SDN controller 206 returns an acknowledgement message 284 to the network element 204 (similar to the node discovery acknowledgement message 274 discussed herein above) or returns a failure indication to the network element 204. Additionally, the update and removal of the corresponding entry in the device discovery table may trigger the SDN controller 206 to request the network element 204 to generate or update the flow table entries corresponding to the IoT device 202 (e.g., updating a flow table entry with a new lifetime provided in the neighbor solicitation message 224 when the neighbor solicitation message 224 causes a node discovery entry update request).

In one embodiment, there is no separate node discovery acknowledgement 274; rather, the request to generate a flow table entry 276 functions as an acknowledgment. In that embodiment, the neighbor advertisement 218 is transmitted from the network element 204 after receiving the request to generate the flow table entry 276.

It is to be noted that neighbor address resolution is performed through the device discovery table in one embodiment of the invention. Since all the IoT devices and network elements are known to the SDN controller and the IoT devices are registered with the device discovery table, there is no need of multicasting a neighbor solicitation message to resolve an unknown destination L2 address. Thus, embodiments of the invention avoids multicasting a neighbor solicitation message by an IoT device.

Flow Diagrams

Figure 5:
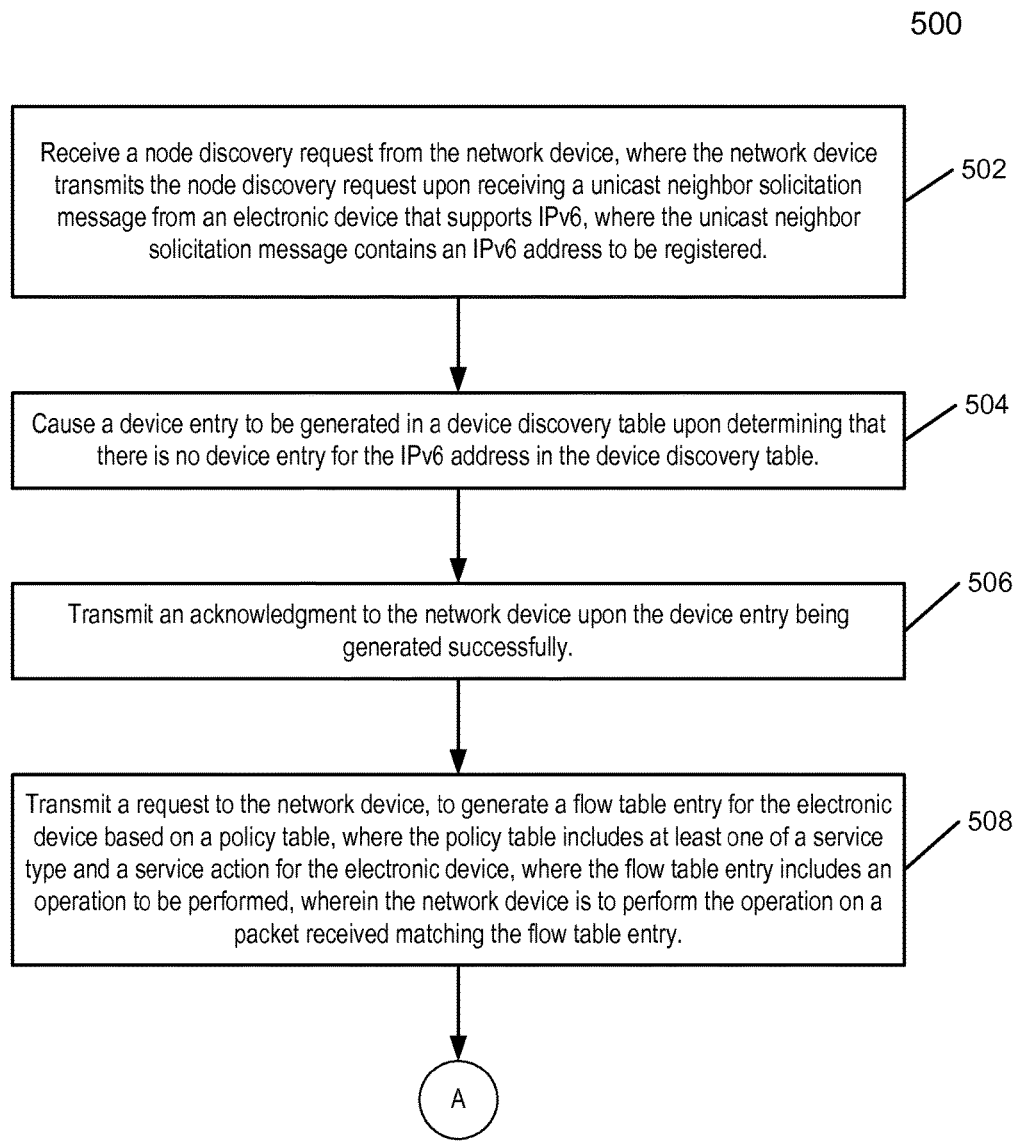
FIG. 5 is a flow diagram illustrating operations of IoT device registration in a SDN system according to one embodiment of the invention.

FIG. 5 is a flow diagram illustrating operations of IoT device registration in a SDN system according to one embodiment of the invention. Method 500 may be implemented in a SDN controller such as the SDN controller 150, 190, or 206 as illustrated in FIGS. 1 and 2 according to one embodiment of the invention, where the SDN controller may be implemented in a network device.

At reference 502, the SDN controller receives a node discovery request from a network device managed by the SDN controller. The network device implements one or more network elements as discussed herein below in relation to FIGS. 7A-F. The network device transmits the node discovery request upon receiving a unicast neighbor solicitation message from an electronic device that supports Internet Protocol version 6 (IPv6). The unicast neighbor solicitation message contains an IPv6 address to be registered, and the unicast neighbor solicitation message includes an address registration option. In one embodiment, the IPv6 address is the IPv6 address of one interface of the electronic device. In one embodiment, the address registration option includes the IPv6 address to be registered.

In one embodiment, the electronic device is one of a plurality of electronic devices within an IEEE 802.15.4 network. In one embodiment, the electronic device includes at least one of the following: a temperature sensor, a moisture sensor, a light intensity sensor, a utility meter, a gas level sensor, a switch device, a light emitter, a sound sensor, a motion sensor, a charging point, a field soil sensor, an industrial device monitor, a building monitor, a bridge monitor, an environmental monitor, and a body sensor.

At reference 504, the SDN controller determines that there is no device entry for the IPv6 address in a device discovery table (e.g., the device discovery table 152) associated with the SDN controller and causes a device entry to be generated in the device discovery table. The device entry may be keyed on the IPv6 address to be registered; and in one embodiment, the device entry includes at least one of an EUI-64 address, an EUI-16 address, and a MAC address. The EUI-address, EUI-16 address, and/or the MAC address are L2 addresses of the electronic device in one embodiment.

In one embodiment, the device entry in the device discovery table includes a lifetime, expiration of which makes the device entry invalid. Additionally, the device entry in the device discovery table in one embodiment includes: (1) a gateway indication, indicating whether the unicast neighbor solicitation message is received through a 6LoWPAN gateway device; (2) a network element or network device ID, indicating from which network element/network device the unicast neighbor solicitation message is received; and/or (3) a network element port ID or network device port ID, indicating from which network element/network device port the unicast neighbor solicitation message is received.

In one embodiment, the IPv6 address, the L2 addresses, the lifetime, the gateway indication, the network element/network device ID, and the network element/network device port ID are extracted from the node discovery request, which includes the values of the IPv6 address, the L2 addresses, the lifetime, and the gateway indication taken from the unicast neighbor solicitation message, and additionally includes the network device/element ID and the network device/element port ID of the network device transmitting the node discovery request. In one embodiment, the value of the device entry is based on input from an application layer (e.g., the application layer 786 in FIG. 7D) provided by an operator in addition to the values extracted from the node discovery request.

At reference 506, the SDN controller transmits an acknowledgment to the network device upon the device entry being generated successfully. If the device entry is not generated successfully, an error indication is transmitted back to the network device.

At reference 508, the SDN controller transmits a request to the network device to generate a flow table entry for the electronic device based on a policy table such as policy table 154. The policy table includes at least one of a service type and a service action to be taken for the electronic device. The flow table entry is generated in the network device, and the flow table entry includes an operation to be performed. The operation to be performed is based on the service type or the service action for the electronic device in one embodiment.

Upon receiving a packet from the electronic device at the network device, the network device will find that the flow table entry matches the packet, and thus performs the operations. The flow table entry includes match fields, which contains one or more of the IPv6 address, the L2 addresses, the gateway indication, the network element/network device ID, and the network element/network device port ID that are discussed herein above. Additionally, the flow table entry includes the lifetime, expiration of which causes the flow table entry to be removed from the network device as discussed herein above. It is to be noted that in some embodiments, the step of transmitting the acknowledgement at reference 506 is omitted, and the transmission of the request at reference 508 is an indication to the network device is an indication that the device entry has been generated successfully.

Figure 6A:
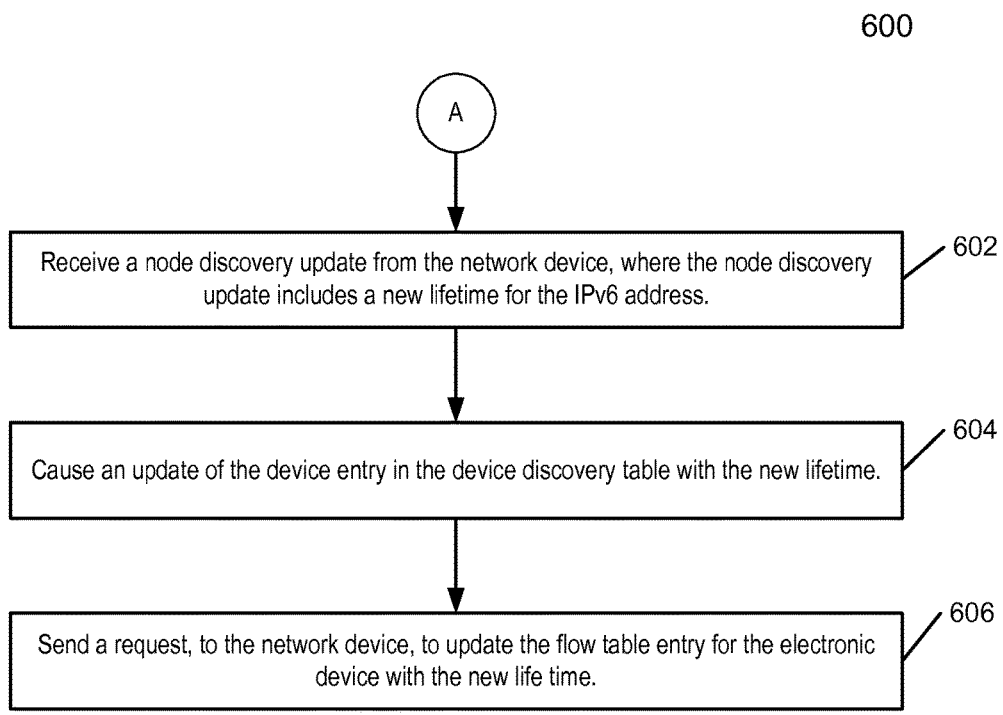
FIG. 6A is a flow diagram illustrating operations of IoT device registration update in a SDN system according to one embodiment of the invention.

Once the electronic device is registered at the device discovery table, the access of the electronic device may be modified through update or removal. FIG. 6A is a flow diagram illustrating operations of IoT device registration update in a SDN system according to one embodiment of the invention. The IoT device is an electronic device. The registration update of method 600 may be a continuation of the registration process of FIG. 5 in one embodiment, and the continuation is illustrated through the shared cycle A in the two figures.

At reference 602, the SDN controller receives a node discovery update from the network device, wherein the node discovery update includes a new lifetime for a registered IPv6 address (e.g., the IPv6 address registered through method 500). The new lifetime is a non-zero value no higher than 18 hours in one embodiment. At reference 604, the SDN controller causes an update of the corresponding device entry with the new lifetime. Then at reference 606, upon the update being executed successfully, the SDN controller transmits a request to the network device to update the flow table entry for the electronic device with the new lifetime. Once the network device updates the lifetime of the flow table entry, the new lifetime takes in effect, and the registration will expires at the new lifetime.

Figure 6B:
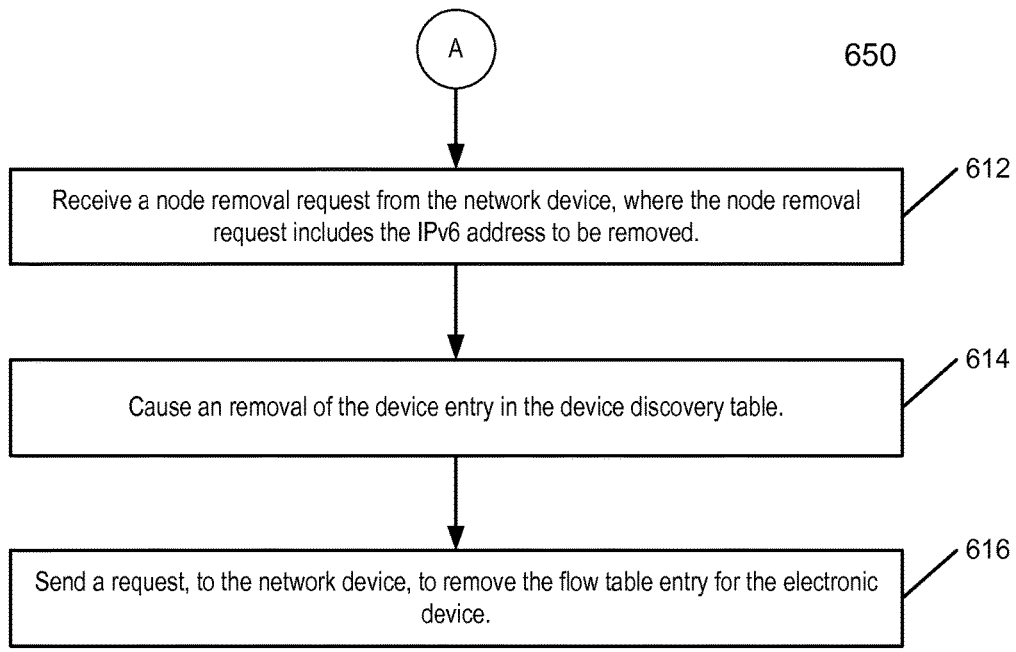
FIG. 6B is a flow diagram illustrating operations of IoT device registration removal in a SDN system according to one embodiment of the invention.

FIG. 6B is a flow diagram illustrating operations of IoT device registration removal in a SDN system according to one embodiment of the invention. The IoT device is an electronic device. The registration removal of method 650 may be a continuation of the registration process of FIG. 5 in one embodiment, and the continuation is illustrated through the shared cycle A in the two figures.

At reference 612, the SDN controller receives a node removal request from the network device, where the node removal request includes the IPv6 address to be removed. In one embodiment, the node removal request is the same as the node discovery update discussed above, but the new lifetime is zero to indicate the registration is to expire immediately.

At reference 614, the SDN controller causes a removal of the device entry corresponding to the IPv6 address. Then upon the device entry being removed successfully, the SDN controller transmits a request to the network device to remove the flow table entry for the electronic device. Once the flow table entry is removed, the electronic device can no longer communicate with the network device based on the earlier registration.

SDN and NFV Environment Utilizing Embodiments of the Invention

Embodiments of the invention may be utilized in a SDN and NFV network containing network devices. A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 7A:
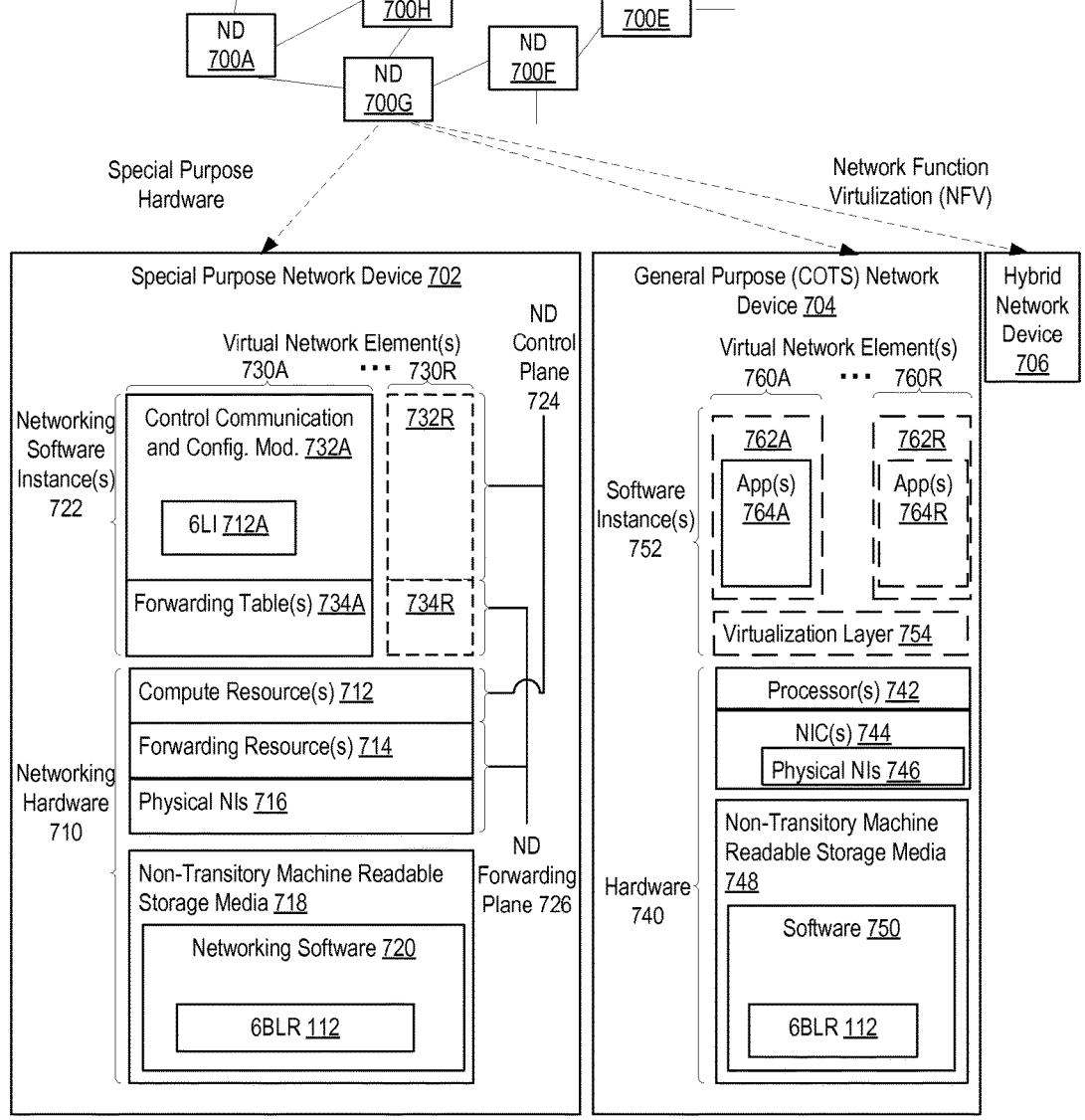
FIG. 7A illustrates connectivity between network devices (NDs) within an exemplary network, as well as three exemplary implementations of the NDs, according to some embodiments of the invention.

FIG. 7A illustrates connectivity between network devices (NDs) within an exemplary network, as well as three exemplary implementations of the NDs, according to some embodiments of the invention. FIG. 7A shows NDs 700A-H and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 700A, E, and F illustrates that these NDs act as ingress and egress points for the network (and thus, these NDs are sometimes referred to as edge NDs; while the other NDs may be called core NDs).

Two of the exemplary ND implementations in FIG. 7A are: 1) a special purpose network device 702 that uses custom application-specific integrated-circuits (ASICs) and a proprietary operating system (OS); and 2) a general purpose network device 704 that uses common off-the-shelf (COTS) processors and a standard OS.

The special purpose network device 702 includes networking hardware 710 comprising compute resource(s) 712 (which typically include a set of one or more processors), forwarding resource(s) 714 (which typically include one or more ASICs and/or network processors), and physical network interfaces (NIs) 716 (sometimes called physical ports), as well as non-transitory machine readable storage media 718 having stored therein networking software 720, including the 6LBR 112 as discussed herein above, which is a software module configured on special purpose network device 702 for coordinating IoT node access functions. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 700A-H. During operation, the 6LBR 112 may be executed by the networking hardware 710 to instantiate a 6LBR instance (6LI) 721A, which perform methods discussed herein above in relation to FIGS. 1-4. 6LI 721A and that part of the networking hardware 710 that executes that instance (be it hardware dedicated to that networking software instance and/or time slices of hardware temporally shared by that networking software instance with others of the networking software instance 722), form a separate virtual network element 730A-R. Each of the virtual network element(s) (VNEs) 730A-R includes a control communication and configuration module 732A-R (sometimes referred to as a local control module or control communication module) and forwarding table(s) 734A-R, such that a given virtual network element (e.g., 730A) includes the control communication and configuration module (e.g., 732A), a set of one or more forwarding table(s) (e.g., 734A), and that portion of the networking hardware 710 that executes the virtual network element (e.g., 730A).

The special purpose network device 702 is often physically and/or logically considered to include: 1) a ND control plane 724 (sometimes referred to as a control plane) comprising the compute resource(s) 712 that execute the control communication and configuration module(s) 732A-R; and 2) a ND forwarding plane 726 (sometimes referred to as a forwarding plane, a data plane, or a media plane) comprising the forwarding resource(s) 714 that utilize the forwarding table(s) 734A-R and the physical NIs 716. By way of example, where the ND is a router (or is implementing routing functionality), the ND control plane 724 (the compute resource(s) 712 executing the control communication and configuration module(s) 732A-R) is typically responsible for participating in controlling how data (e.g., packets) is to be routed (e.g., the next hop for the data and the outgoing physical NI for that data) and storing that routing information in the forwarding table(s) 734A-R, and the ND forwarding plane 726 is responsible for receiving that data on the physical NIs 716 and forwarding that data out the appropriate ones of the physical NIs 716 based on the forwarding table(s) 734A-R.

Figure 7B:
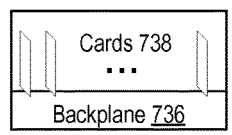
FIG. 7B illustrates an exemplary way to implement a special purpose network device according to some embodiments of the invention.

FIG. 7B illustrates an exemplary way to implement the special purpose network device 702 according to some embodiments of the invention. FIG. 7B shows a special purpose network device including cards 738 (typically hot pluggable). While in some embodiments the cards 738 are of two types (one or more that operate as the ND forwarding plane 726 (sometimes called line cards), and one or more that operate to implement the ND control plane 724 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 736 (e.g., a first full mesh coupling the line cards and a second full mesh coupling all of the cards).

Returning to FIG. 7A, the general purpose network device 704 includes hardware 740 comprising a set of one or more processor(s) 742 (which are often COTS processors) and network interface controller(s) 744 (NICs; also known as network interface cards) (which include physical NIs 746), as well as non-transitory machine readable storage media 748 having stored therein software 750, which may also contain the 6BLR 212. During operation, the processor(s) 742 execute the software 750 to instantiate one or more sets of one or more applications 764A-R (including the instance of 6BLR 212). While one embodiment does not implement virtualization, alternative embodiments may use different forms of virtualization—represented by a virtualization layer 754 and software containers 762A-R. For example, one such alternative embodiment implements operating system-level virtualization, in which case the virtualization layer 754 represents the kernel of an operating system (or a shim executing on a base operating system) that allows for the creation of multiple software containers 762A-R that may each be used to execute one of the sets of applications 764A-R. In this embodiment, the multiple software containers 762A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: 1) the virtualization layer 754 represents a hypervisor (sometimes referred to as a virtual machine monitor (VMM)) or a hypervisor executing on top of a host operating system; and 2) the software containers 762A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 764A-R, as well as the virtualization layer 754 and software containers 762A-R if implemented, are collectively referred to as software instance(s) 752. Each set of applications 764A-R, corresponding software container 762A-R if implemented, and that part of the hardware 740 that executes them (be it hardware dedicated to that execution and/or time slices of hardware temporally shared by software containers 762A-R), forms a separate virtual network element(s) 760A-R.

The virtual network element(s) 760A-R perform similar functionality to the virtual network element(s) 730A-R— e.g., similar to the control communication and configuration module(s) 732A and forwarding table(s) 734A (this virtualization of the hardware 740 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the software container(s) 762A-R differently. For example, while embodiments of the invention are illustrated with each software container 762A-R corresponding to one VNE 760A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 762A-R to VNEs also apply to embodiments where such a finer level of granularity is used.

In certain embodiments, the virtualization layer 754 includes a virtual switch that provides similar forwarding services as a physical Ethernet switch. Specifically, this virtual switch forwards traffic between software containers 762A-R and the NIC(s) 744, as well as optionally between the software containers 762A-R; in addition, this virtual switch may enforce network isolation between the VNEs 760A-R that by policy are not permitted to communicate with each other (e.g., by honoring virtual local area networks (VLANs)).

The third exemplary ND implementation in FIG. 7A is a hybrid network device 706, which includes both custom ASICs/proprietary OS and COTS processors/standard OS in a single ND or a single card within an ND. In certain embodiments of such a hybrid network device, a platform VM (i.e., a VM that that implements the functionality of the special purpose network device 702) could provide for para-virtualization to the networking hardware present in the hybrid network device 706.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 730A-R, VNEs 760A-R, and those in the hybrid network device 706) receives data on the physical NIs (e.g., 716, 746) and forwards that data out the appropriate ones of the physical NIs (e.g., 716, 746). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

FIG. 7C illustrates various exemplary ways in which VNEs may be coupled according to some embodiments of the invention. FIG. 7C shows VNEs 770A.1-770A.P (and optionally VNEs 770A.Q-770A.R) implemented in ND 700A and VNE 770H.1 in ND 700H. In FIG. 7C, VNEs 770A.1-P are separate from each other in the sense that they can receive packets from outside ND 700A and forward packets outside of ND 700A; VNE 770A.1 is coupled with VNE 770H.1, and thus they communicate packets between their respective NDs; VNE 770A.2-770A.3 may optionally forward packets between themselves without forwarding them outside of the ND 700A; and VNE 770A.P may optionally be the first in a chain of VNEs that includes VNE 770A.Q followed by VNE 770A.R (this is sometimes referred to as dynamic service chaining, where each of the VNEs in the series of VNEs provides a different service— e.g., one or more layer 4-7 network services). While FIG. 7C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 7A, for example, may form part of the Internet or a private network; and other electronic devices (not shown; such as end user devices including workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 7A may also host one or more such servers (e.g., in the case of the general purpose network device 704, one or more of the virtual machines 762A-R may operate as servers; the same would be true for the hybrid network device 706; in the case of the special purpose network device 702, one or more such servers could also be run on a hypervisor executed by the compute resource(s) 712); in which case the servers are said to be co-located with the VNEs of that ND.

A virtual network is a logical abstraction of a physical network (such as that in FIG. 7A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

FIG. 7D illustrates a network with a single network element on each of the NDs of FIG. 7A. Specifically, FIG. 7D illustrates network elements (NEs) 770A-H with the same connectivity as the NDs 700A-H of FIG. 7A with a centralized approach for maintaining reachability and forwarding information (also called network control), according to some embodiments of the invention.

FIG. 7D illustrates that a centralized approach 774 (also known as software defined networking (SDN)) that decouples the system that makes decisions about where traffic is sent from the underlying systems that forwards traffic to the selected destination. The illustrated centralized approach 774 has the responsibility for the generation of reachability and forwarding information in a centralized control plane 776 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 776 has a south bound interface 782 with a data plane 780 (sometime referred to the infrastructure layer, network forwarding plane, or forwarding plane (which should not be confused with a ND forwarding plane)) that includes the NEs 770A-H (sometimes referred to as switches, forwarding elements, data plane elements, or nodes). The centralized control plane 776 includes a network controller 778, which includes a centralized reachability and forwarding information module 779 that determines the reachability within the network and distributes the forwarding information to the NEs 770A-H of the data plane 780 over the south bound interface 782 (which may use the OpenFlow protocol). The centralized reachability and forwarding information module 779 contains the device discovery manager 150 as illustrated in, and described with reference to, FIGS. 1-2.

The network intelligence is centralized in the centralized control plane 776 executing on electronic devices that are typically separate from the NDs. For example, where the special purpose network device 702 is used in the data plane 780, each of the control communication and configuration module(s) 732A-R of the ND control plane 724 typically include a control agent that provides the VNE side of the south bound interface 782. In this case, the ND control plane 724 (the compute resource(s) 712 executing the control communication and configuration module(s) 732A-R) performs its responsibility for participating in controlling how data (e.g., packets) is to be routed (e.g., the next hop for the data and the outgoing physical NI for that data) through the control agent communicating with the centralized control plane 776 to receive the forwarding information (and in some cases, the reachability information) from the centralized reachability and forwarding information module 779 (it should be understood that in some embodiments of the invention, the control communication and configuration module(s) 732A-R, in addition to communicating with the centralized control plane 776, may also play some role in determining reachability and/or calculating forwarding information—albeit less so than in the case of a distributed approach; such embodiments are generally considered to fall under the centralized approach 774, but may also be considered a hybrid approach).

While the above example uses the special purpose network device 702, the same centralized approach 774 can be implemented with the general purpose network device 704 (e.g., each of the VNE 760A-R performs its responsibility for controlling how data (e.g., packets) is to be routed (e.g., the next hop for the data and the outgoing physical NI for that data) by communicating with the centralized control plane 776 to receive the forwarding information (and in some cases, the reachability information) from the centralized reachability and forwarding information module 779; it should be understood that in some embodiments of the invention, the VNEs 760A-R, in addition to communicating with the centralized control plane 776, may also play some role in determining reachability and/or calculating forwarding information—albeit less so than in the case of a distributed approach) and the hybrid network device 706. In fact, the use of SDN techniques can enhance the NFV techniques typically used in the general purpose network device 704 or hybrid network device 706 implementations as NFV is able to support SDN by providing an infrastructure upon which the SDN software can be run, and NFV and SDN both aim to make use of commodity server hardware and physical switches.

FIG. 7D also shows that the centralized control plane 776 has a north bound interface 784 to an application layer 786, in which resides application(s) 788. The centralized control plane 776 has the ability to form virtual networks 792 (sometimes referred to as a logical forwarding plane, network services, or overlay networks (with the NEs 770A-H of the data plane 780 being the underlay network)) for the application(s) 788. Thus, the centralized control plane 776 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 7D illustrates the simple case where each of the NDs 700A-H implements a single NE 770A-H, it should be understood that the network control approaches described with reference to FIG. 7D also work for networks where one or more of the NDs 700A-H implement multiple VNEs (e.g., VNEs 730A-R, VNEs 760A-R, those in the hybrid network device 706). Alternatively or in addition, the network controller 778 may also emulate the implementation of multiple VNEs in a single ND. Specifically, instead of (or in addition to) implementing multiple VNEs in a single ND, the network controller 778 may present the implementation of a VNE/NE in a single ND as multiple VNEs in the virtual networks 792 (all in the same one of the virtual network(s) 792, each in different ones of the virtual network(s) 792, or some combination). For example, the network controller 778 may cause an ND to implement a single VNE (a NE) in the underlay network, and then logically divide up the resources of that NE within the centralized control plane 776 to present different VNEs in the virtual network(s) 792 (where these different VNEs in the overlay networks are sharing the resources of the single VNE/NE implementation on the ND in the underlay network).

On the other hand, FIGS. 7E and 7F respectively illustrate exemplary abstractions of NEs and VNEs that the network controller 778 may present as part of different ones of the virtual networks 792. FIG. 7E illustrates the simple case of where each of the NDs 700A-H implements a single NE 770A-H (see FIG. 7D), but the centralized control plane 776 has abstracted multiple of the NEs in different NDs (the NEs 770A-C and G-H) into (to represent) a single NE 7701 in one of the virtual network(s) 792 of FIG. 7D, according to some embodiments of the invention. FIG. 7E shows that in this virtual network, the NE 7701 is coupled to NE 770D and 770F, which are both still coupled to NE 770E.

FIG. 7F illustrates a case where multiple VNEs (VNE 770A.1 and VNE 770H.1) are implemented on different NDs (ND 700A and ND 700H) and are coupled to each other, and where the centralized control plane 776 has abstracted these multiple VNEs such that they appear as a single VNE 770T within one of the virtual networks 792 of FIG. 7D, according to some embodiments of the invention. Thus, the abstraction of a NE or VNE can span multiple NDs.

While some embodiments of the invention implement the centralized control plane 776 as a single entity (e.g., a single instance of software running on a single electronic device), alternative embodiments may spread the functionality across multiple entities for redundancy and/or scalability purposes (e.g., multiple instances of software running on different electronic devices).

Figure 8:
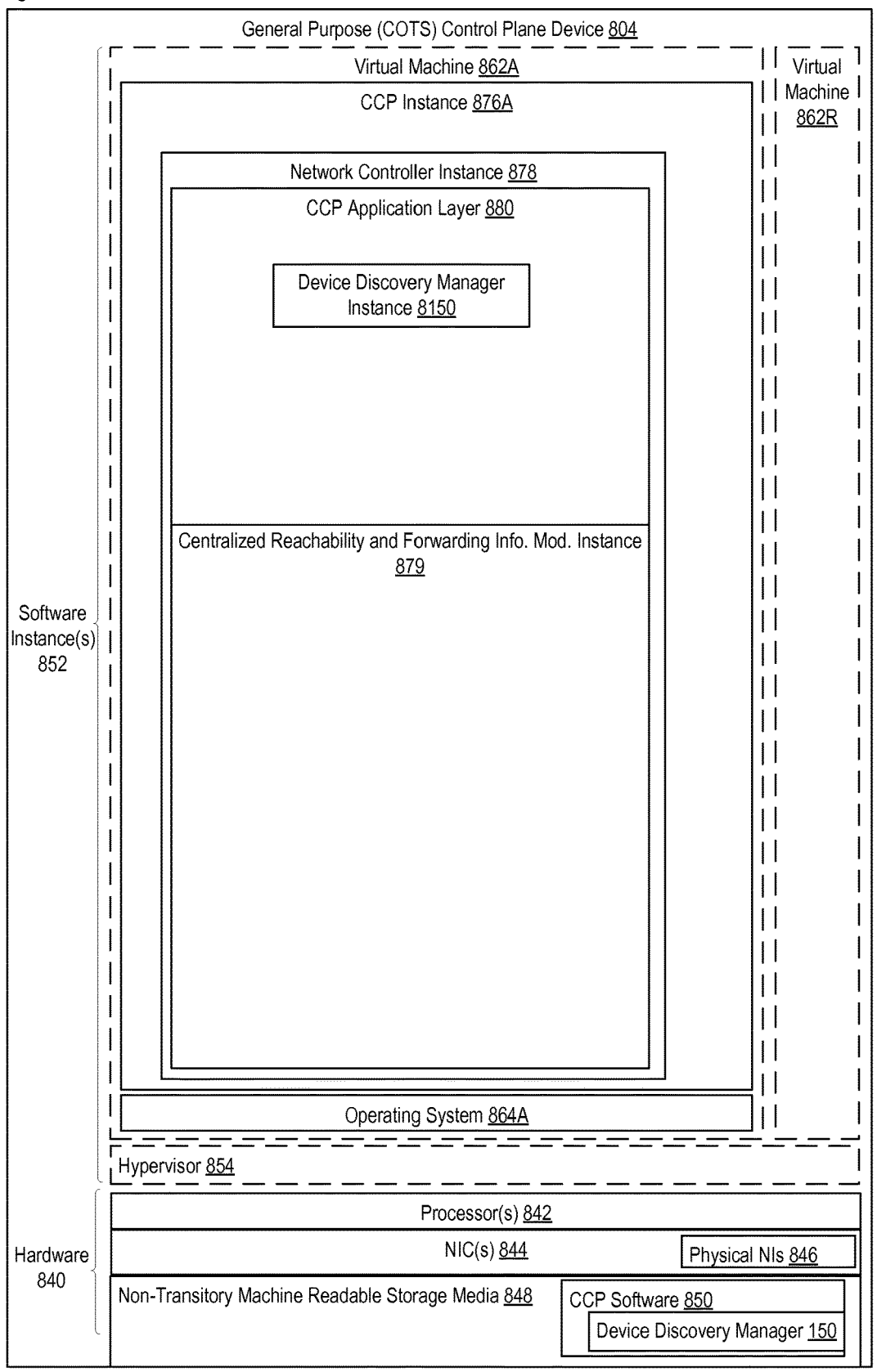
FIG. 8 illustrates a general purpose control plane device with centralized control plane (CCP) software according to some embodiments of the invention.

Similar to the network device implementations, the electronic device(s) running the centralized control plane 776, and thus the network controller 778 including the centralized reachability and forwarding information module 779, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 8 illustrates, a general purpose control plane device 804 including hardware 840 comprising a set of one or more processor(s) 842 (which are often COTS processors) and network interface controller(s) 844 (NICs; also known as network interface cards) (which include physical NIs 846), as well as non-transitory machine readable storage media 848 having stored therein centralized control plane (CCP) software 850. The CCP software 850 includes the device discovery manager 155 discussed herein above.

In embodiments that use compute virtualization, the processor(s) 842 typically execute software to instantiate a virtualization layer 854 and software container(s) 862A-R (e.g., with operating system-level virtualization, the virtualization layer 854 represents the kernel of an operating system (or a shim executing on a base operating system) that allows for the creation of multiple software containers 862A-R (representing separate user space instances and also called virtualization engines, virtual private servers, or jails) that may each be used to execute a set of one or more applications; with full virtualization, the virtualization layer 854 represents a hypervisor (sometimes referred to as a virtual machine monitor (VMM)) or a hypervisor executing on top of a host operating system, and the software containers 862A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in embodiments where compute virtualization is used, during operation an instance of the CCP software 850 (illustrated as CCP instance 876A) is executed within the software container 862A on the virtualization layer 854. In embodiments where compute virtualization is not used, the CCP instance 876A on top of a host operating system is executed on the "bare metal" general purpose control plane device 804. The instantiation of the CCP instance 876A, as well as the virtualization layer 854 and software containers 862A-R if implemented, are collectively referred to as software instance(s) 852.

In some embodiments, the CCP instance 876A includes a network controller instance 878. The network controller instance 878 includes a centralized reachability and forwarding information module instance 879 (which is a middleware layer providing the context of the network controller 778 to the operating system and communicating with the various NEs), and an CCP application layer 880 (sometimes referred to as an application layer) over the middleware layer (providing the intelligence required for various network operations such as protocols, network situational awareness, and user-interfaces). A device discovery manager instance 8150 is included in the CCP application layer 880 in one embodiment. At a more abstract level, this CCP application layer 880 within the centralized control plane 776 works with virtual network view(s) (logical view(s) of the network) and the middleware layer provides the conversion from the virtual networks to the physical view.

The centralized control plane 776 transmits relevant messages to the data plane 780 based on CCP application layer 880 calculations and middleware layer mapping for each flow. A flow may be defined as a set of packets whose headers match a given pattern of bits; in this sense, traditional IP forwarding is also flow—based forwarding where the flows are defined by the destination IP address for example; however, in other implementations, the given pattern of bits used for a flow definition may include more fields (e.g., 10 or more) in the packet headers. Different NDs/NEs/VNEs of the data plane 780 may receive different messages, and thus different forwarding information. The data plane 780 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched).

Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 780, the packet (or a subset of the packet header and content) is typically forwarded to the centralized control plane 776. The centralized control plane 776 will then program forwarding table entries into the data plane 780 to accommodate packets belonging to the flow of the unknown packet. Once a specific forwarding table entry has been programmed into the data plane 780 by the centralized control plane 776, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Each VNE (e.g., a virtual router, a virtual bridge (which may act as a virtual switch instance in a Virtual Private LAN Service (VPLS) (RFC 4761 and 4762) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs) the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

Some NDs include functionality for authentication, authorization, and accounting (AAA) protocols (e.g., RADIUS (Remote Authentication Dial-In User Service), Diameter, and/or TACACS+ (Terminal Access Controller Access Control System Plus). AAA can be provided through a client/server model, where the AAA client is implemented on a ND and the AAA server can be implemented either locally on the ND or on a remote electronic device coupled with the ND. Authentication is the process of identifying and verifying a subscriber. For instance, a subscriber might be identified by a combination of a username and a password or through a unique key. Authorization determines what a subscriber can do after being authenticated, such as gaining access to certain electronic device information resources (e.g., through the use of access control policies). Accounting is recording user activity. By way of a summary example, end user devices may be coupled (e.g., through an access network) through an edge ND (supporting AAA processing) coupled to core NDs coupled to electronic devices implementing servers of service/content providers. AAA processing is performed to identify for a subscriber the subscriber record stored in the AAA server for that subscriber. A subscriber record includes a set of attributes (e.g., subscriber name, password, authentication information, access control information, rate-limiting information, policing information) used during processing of that subscriber's traffic.

The operations of the flow diagram FIGS. 5-6 are described with reference to the exemplary embodiment of FIGS. 1-4, 7A-F, and 8. However, it should be understood that the operations of flow diagrams can be performed by embodiments of the invention other than those discussed with reference to the exemplary embodiment of FIGS. 1-4, 7A-F, and 8, and the exemplary embodiment of FIGS. 1-4, 7A-F, and 8 can perform operations different than those discussed with reference to the flow diagram of FIGS. 5-6.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

Different embodiments of the invention may be implemented using different combinations of software, firmware, and/or hardware. Thus, the techniques shown in the figures can be implemented using code and data stored and executed on one or more electronic devices (e.g., an end system, a network device). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented in a software-defined networking (SDN) controller of a SDN system, wherein the SDN system contains the SDN controller managing a network device, the method comprising:
   receiving a node discovery request from the network device, wherein the network device transmits the node discovery request upon receiving a unicast neighbor solicitation message from an electronic device that supports Internet Protocol version 6 (IPv6), wherein the unicast neighbor solicitation message contains an IPv6 address, identifying the electronic device, to be registered in a device discovery table;
   causing a device entry to be generated in the device discovery table upon determining that there is no device entry for the IPv6 address in the device discovery table;
   transmitting an acknowledgment to the network device upon the device entry being generated successfully;
   transmitting a request to the network device to generate a flow table entry for the electronic device based on a policy table, wherein the policy table includes at least one of a service type and a service action for the electronic device, wherein the flow table entry includes an operation to be performed, wherein the network device is to perform the operation on a packet received matching the flow table entry, wherein the device entry in the device discovery table includes a lifetime, and wherein the flow table entry is to include the lifetime, expiration of which causes the flow table entry to be removed from the network device;
   receiving a node discovery update from the network device, wherein the node discovery update includes a new lifetime for the IPv6 address;
   causing an update of the device entry in the device discovery table with the new lifetime; and
   transmitting a request to the network device to update the flow table entry for the electronic device with the new lifetime.

2. The method of claim 1, wherein the electronic device is one of a plurality of electronic devices within an Institute of Electrical and Electronics Engineers (IEEE) 802.15.4 network.

3. The method of claim 1, where the electronic device includes at least one of the following: a temperature sensor, a moisture sensor, a light intensity sensor, a utility meter, a gas level sensor, a switch device, a light emitter, a sound sensor, a motion sensor, a charging point, a field soil sensor, an industrial device monitor, a building monitor, a bridge monitor, an environmental monitor, and a body sensor.

4. The method of claim 1, wherein the device entry includes at least one of an extended unique identifier (EUI-64) address, an EUI-16 address, and a media access control (MAC) address.

5. The method of claim 1, wherein the flow table entry further includes an indication of whether to match a packet received through an IPv6 over low power wireless personal area network (6LoWPAN) gateway device.

6. The method of claim 1, further comprising:
receiving a node removal request from the network device, wherein the node removal request includes the IPv6 address;
causing a removal of the device entry in the device discovery table; and
transmitting a request, to the network device, to remove the flow table entry for the electronic device.

7. A software-defined networking (SDN) controller of a SDN system, wherein the SDN system contains the SDN controller managing a network device, the SDN controller comprising:
a processor and a non-transitory machine-readable storage medium coupled to the processor, the non-transitory machine-readable storage medium containing operations executable by the processor, wherein the SDN controller is operative to:
receive a node discovery request from the network device, wherein the network device transmits the node discovery request upon receiving a unicast neighbor solicitation message from an electronic device that supports Internet Protocol version 6 (IPv6), wherein the unicast neighbor solicitation message contains an IPv6 address, identifying the electronic device, to be registered in a device discovery table,
cause a device entry to be generated in the device discovery table upon determining that there is no device entry for the IPv6 address in the device discovery table,
transmit an acknowledgment to the network device upon the device entry being generated successfully,
transmit a request to the network device to generate a flow table entry for the electronic device based on a policy table, wherein the policy table includes at least one of a service type and a service action for the electronic device, wherein the flow table entry is to include an operation to be performed, wherein the network device is to perform the operation on a packet received matching the flow table entry,
receive a node removal request from the network device, wherein the node removal request includes the IPv6 address,
cause a removal of the device entry in the device discovery table, and
transmit a request, to the network device, to remove the flow table entry for the electronic device.

8. The SDN controller of claim 7, wherein the electronic device is one of a plurality of electronic devices within an Institute of Electrical and Electronics Engineers (IEEE) 802.15.4 network.

9. The SDN controller of claim 7, wherein the device entry includes at least one of an extended unique identifier (EUI-64) address, an EUI-16 address, and a media access control (MAC) address.

10. The SDN controller of claim 7, wherein the flow table entry is to further include an indication of whether to match a packet received through an IPv6 over low power wireless personal area networks (6LoWPAN) gateway device.

11. A non-transitory machine-readable storage medium having instructions stored therein, which when executed by a processor, cause the processor to perform operations in a software-defined networking (SDN) controller of a SDN system, wherein the SDN system contains the SDN controller managing a network device, the operations comprising:
receiving a node discovery request from the network device, wherein the network device transmits the node discovery request upon receiving a unicast neighbor solicitation message from an electronic device that supports Internet Protocol version 6 (IPv6), wherein the unicast neighbor solicitation message contains an IPv6 address, identifying the electronic device, to be registered in a device discovery table;
causing a device entry to be generated in the device discovery table upon determining that there is no device entry for the IPv6 address in the device discovery table;
transmitting an acknowledgment to the network device upon the device entry being generated successfully;
transmitting a request to the network device to generate a flow table entry for the electronic device based on a policy table, wherein the policy table includes at least one of a service type and a service action for the electronic device, wherein the flow table entry includes an operation to be performed, wherein the network device is to perform the operation on a packet received matching the flow table entry, wherein the device entry in the device discovery table includes a lifetime, wherein the flow table entry is to include the lifetime, expiration of which causes the flow table entry to be removed from the network device
receiving a node discovery update from the network device, wherein the node discovery update includes a new lifetime for the IPv6 address;
causing an update of the device entry in the device discovery table with the new lifetime; and
transmitting a request to the network device to update the flow table entry for the electronic device with the new lifetime.

12. The non-transitory machine-readable storage medium of claim 11, wherein the electronic device is one of a plurality of electronic devices within an Institute of Electrical and Electronics Engineers (IEEE) 802.15.4 network.

13. The non-transitory machine-readable storage medium of claim 11, wherein the device entry includes at least one of an extended unique identifier (EUI-64) address, an EUI-16 address, and a media access control (MAC) address.

14. The non-transitory machine-readable storage medium of claim 11, wherein the flow table entry further includes an indication of whether to match a packet received through an IPv6 over low power wireless personal area networks (6LoWPAN) gateway device.

15. The non-transitory machine-readable storage medium of claim 11, the operations further comprising:
receiving a node removal request from the network device, wherein the node removal request includes the IPv6 address;
removing the device entry in the device discovery table; and
transmitting a request, to the network device, to remove the flow table entry for the electronic device.

* * * * *